May 31, 1960 J. B. DEPMAN 2,938,542
AIR SUSPENSION CONTROL APPARATUS
Filed Sept. 30, 1957 2 Sheets-Sheet 1

INVENTOR.
Joseph B. Depman
BY
ATTORNEY

May 31, 1960
J. B. DEPMAN
2,938,542
AIR SUSPENSION CONTROL APPARATUS
Filed Sept. 30, 1957
2 Sheets-Sheet 2
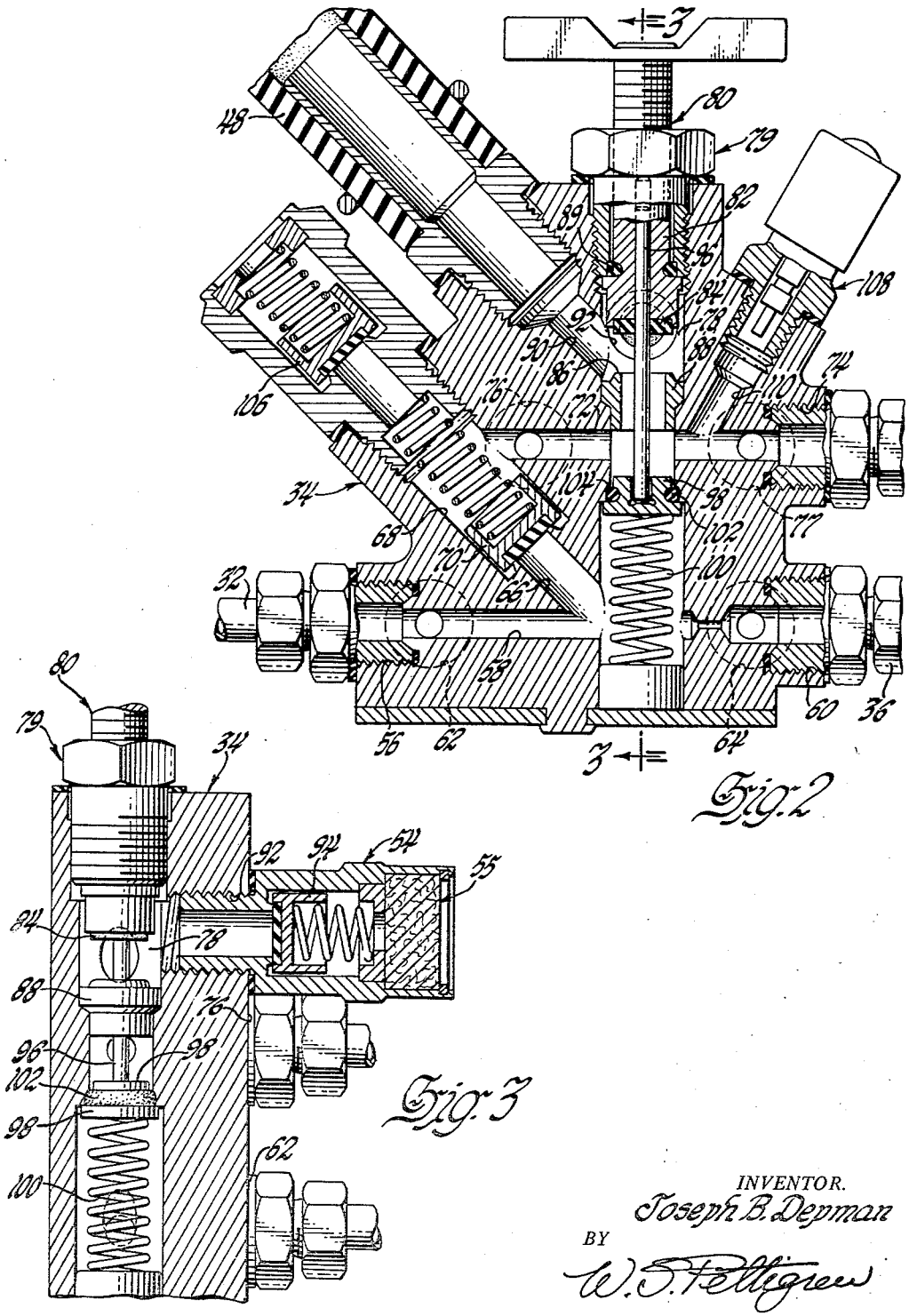
INVENTOR.
Joseph B. Depman
BY
W. S. Pettigrew
ATTORNEY

United States Patent Office 2,938,542
Patented May 31, 1960

2,938,542
AIR SUSPENSION CONTROL APPARATUS

Joseph B. Depman, Birmingham, Mich., assignor to General Motors Corporation, Detroit, Mich., a corporation of Delaware Filed Sept. 30, 1957, Ser. No. 687,005
5 Claims. (Cl. 137—599.1)

This invention relates to vehicle air suspension and more particularly to air suspension systems and fluid control apparatus therefor.

An object of the present invention is to provide an improved air suspension system.

Another object is to provide an air suspension system incorporating improved and simplified control apparatus.

A further object is to provide an air distribution system for pneumatic vehicle suspension incorporating means for preventing deflation of the air springs when the sprung mass is jacked or otherwise forcibly elevated relative to the unsprung mass.

Still another object is to provide in a pneumatic vehicle suspension of the type utilizing a substantially closed fluid distribution system, an automatic control device which is operable to prevent excessive pressure build-up in the system.

A still further object is to provide a junction assembly for air suspension fluid distribution system of the type employing a high pressure supply circuit and a low pressure exhaust circuit, wherein the junction assembly incorporates a plurality of sequentially operable pressure relieving devices which are adjusted respectively so that pressure above a predetermined level in the high pressure circuit is discharged initially into the low pressure circuit until a second predetermined pressure level exists in the latter, whereupon excessive pressure is discharged to atmosphere.

Yet a further object is to provide a device of the stated character including means effective to disable operation of the second pressure relieving means permitting establishment of equalized pressure in both the high pressure and low pressure circuits.

A still further object is to provide a device of the stated character wherein the low pressure circuit includes a return conduit communicating with a source of compressed air, wherein the means for disabling the second pressure relieving means coincidentally prevents movement of air from the low pressure circuit through the return conduit leading to the source of compressed air so that one or all corners of the vehicle may be forcibly elevated without loss of internal air pressure in the vehicle springs.

A still further object is to provide a device of the stated character including a third pressure relieving means operable to prevent excessive pressure build-up in the system and springs when the second pressure relieving means is disabled.

These and other objects, advantages and features of the invention will become more fully apparent as reference is had to the accompanying specification and drawings wherein:

Fig. 2 is an enlarged view, partly in section, illustrating the form and arrangement of parts of the control device employed in the system shown in Fig. 1; and Fig. 3 is an enlarged view, partly in section, looking in the direction of arrows 3—3 of Fig. 2.

Figure 1:
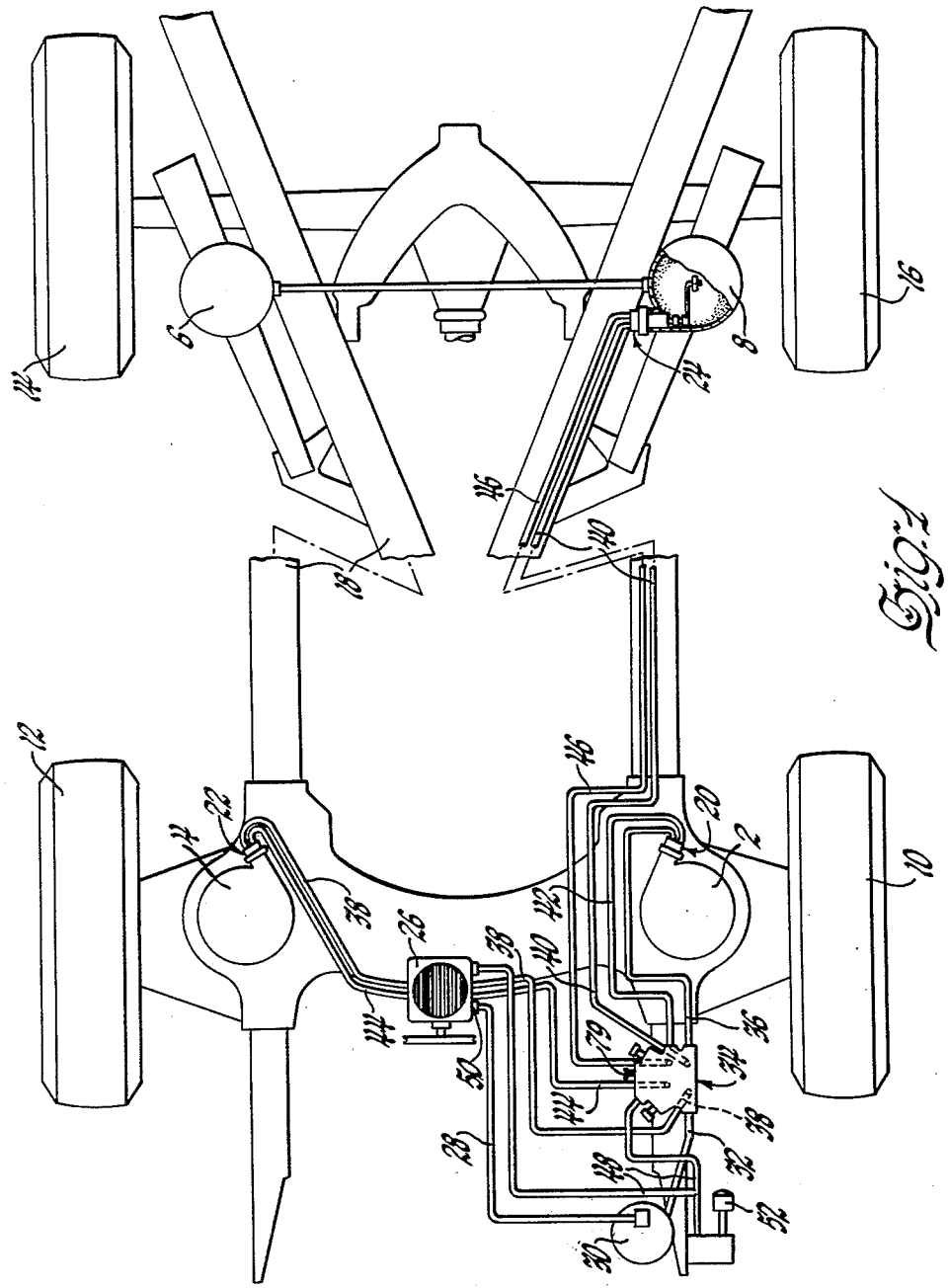
Fig. 1 is a schematic layout of a vehicle suspension system of the general type described incorporating a fluid distribution control device according to the present invention.

Referring now to the drawings and particularly Fig. 1, there is shown schematically a vehicle suspension employing confined air as the elastic medium. In the drawings, reference numerals 2, 4, 6 and 8 designate individual air spring assemblies which resiliently support the vehicle frame 18 relative to vehicle wheels 10, 12, 14 and 16. Air pressure in each of the springs is continuously regulated by means of three height sensing valve assemblies 20, 22 and 24 which operate in a known manner to maintain the respective corners of the vehicle frame at a predetermined vertical level regardless of the load imposed on the frame. It will be understood that each leveling valve incorporates an exhaust valve and an intake valve, not shown, which are operable responsive to variation in vehicle trim to either admit or exhaust air as the case may be. In the embodiment shown, air distribution is accomplished in a manner commonly referred to as a semiclosed type system in which superatmospheric air supplied by compressor 26 is delivered through a conduit 28 to a high pressure storage tank 30 from which it is directed through a conduit 32 to a manifold junction block assembly 34. From junction 34 high pressure air moves through high pressure conduits 36, 38 and 40 to the intake sides of leveling valves 20, 22 and 24, respectively, for admission to the vehicle springs. Conversely, air exhausted from the springs moves through exhaust conduits 42, 44 and 46 to the junction 34 for return via conduit 48 to the inlet side 50 of the air compressor, where the cycle is repeated. Interposed in return conduit 48 is a one-way atmosphere intake valve 52 which allows induction of atmospheric air into compressor inlet 50 to make up any air losses occurring during normal operation of the system. Since a system of the type referred to may occasionally produce momentary excessive pressure in the low pressure conduits, junction 34 is provided with a relief valve assembly 54 which communicates with the various return conduits to permit venting thereof to atmosphere when the pressure therein exceeds a predetermined level. To reduce the noise produced by escaping air, assembly 54 includes a silencer screen 55. It will be understood that both venting of the return lines to atmosphere and the corollary necessity for atmosphere make-up occurs relatively infrequently. Therefore, particularly during normal operation of a vehicle, only recirculation of the system air charge occurs. As a result, the incidence of contamination of the air supply by water and other matter normally suspended in atmospheric air is greatly reduced in comparison to a conventional open system where each cycle of operation involves a complete change of air.

As seen best in Figs. 2 and 3, junction block 34 is provided with a high pressure inlet port 56 which receives air from high pressure tank 30 via conduit 32. Extending horizontally from port 56 across block 34 is a transverse drilled passage 58 forming a high pressure manifold providing common communication with high pressure outlet ports 60, 62 and 64 which, in turn, are connected to high pressure conduits 36, 38 and 40, respectively. Extending diagonally from passage 58 is a branch passage 66 having a counterbore 68 in which is disposed a spring biased high pressure check valve 70 which serves to limit the maximum pressure in the high pressure circuit. While the particular pressure setting of valve 70 will vary depending upon the design requirements of the particular suspension system, for the purposes of description valve 70 may be regarded as establishing a high pressure limit of 250 p.s.i. Upstream of check valve 70, counterbore 68 communicates with a second transverse horizontal passage 72 which forms a low pressure manifold providing common communication with exhaust inlet ports 74, 76 and 77, the latter of which are connected to exhaust conduits 42, 44 and 46.

In accordance with one feature of the invention, the center of junction block 34 is provided with a vertical drilled passage 78 which extends downwardly to intersect both transverse passages 72 and 58. Passage 78 is adapted to threadably receive fitting 79 having a manually operable valve structure 80 reciprocably mounted therein. Valve 80 includes a shank portion 82, the lower enlarged end of which has recessed therein a resilient circular pad forming valve closure 84. Closure 84 is adapted to compressively engage the annular rim 86 of a valve seat 88 press fitted in passage 78 immediately above horizontal passage 72. Branching diagonally from passage 78 above valve seat 88 is an exhaust passage 90 which is connected to return conduit 48 leading to the compressor inlet 50. A second branch passage 92 extends horizontally from passage 78 and has disposed therein a second relief valve 94 which in the illustrated embodiment is set to relieve pressure in the low pressure circuit in excess of 25 p.s.i. To prevent possible leakage of air past the shank 82 of valve 80, an O-ring 89 is disposed in a groove at the juncture of the shank 80 and enlarged end thereof. When valve 80 is fully open, O-ring 89 effects fluid tight engagement with the end of fitting 79. During normal operation, valve 80 is rotated to the position shown wherein the closure 84 is spaced vertically from valve seat 88 thus allowing exhaust air from ports 74, 76 and 77 to pass through branch passage 90 for return to compressor 26 or, if the low pressure circuit pressure becomes excessive, to permit venting of excessive pressure to atmosphere through relief valve 94. However, when valve 80 is rotated manually to cause closure 84 to engage the valve seat 86, flow of air from low pressure return lines 42, 44 and 46 is blocked through both normal avenues of exit (passages 90 and 92). Therefore, any or all corners of the vehicle may be jacked up without loss of air pressure in the springs even though the leveling valves 20, 22 and 24 respond to such variation in trim height by moving to positions permitting escape of air from their associated springs. It will, of course, be evident that return of valve 80 to the position shown will promptly restore the system to normal operation.

In accordance with another feature of the invention, valve 80 has an extension rod 96 secured thereto which passes downwardly through annular valve seat 88 and engages a second valve closure 98 which is continuously biased upwardly by a coil spring 100. Closure 98 has mounted thereon an O-ring 102 which engages an outward annular shoulder 104 formed in passage 78 between horizontal passages 72 and 58. In operation, closure 98 moves downwardly in concert with downward movement of closure 84 so that when closure 84 is seated closure 98 is unseated. In consequence, closure 98 operates to establish open communication between passages 58 and 72 simultaneously with the blocking of exhaust exits 90 and 92 effected by closure 84. As a result, exhaust of air from springs 2, 4, 6 and 8 is not only prevented, but in addition all four corners of the vehicle may, if desired, be raised to any desired trim level, within the mechanical limits of the suspension structure, merely by operation of the compressor 26. Thus, high pressure air generated by the compressor is distributed to both the intake and exhaust lines due to open communication effected by opening of closure 98. The resultant increase in pressure in the low pressure conduits will cause a reversed pressure differential between the exhaust line and the spring. High pressure air will be admitted to the springs through the exhaust side of the leveling valves causing increased inflation of the springs and thus resulting in progressive increase in height clearance of the sprung mass. In forms of leveling valves which do not respond to pressure differentials, the operation just described is easily initiated by momentarily depressing the sprung mass until a slight additional amount of air has been introduced into the springs through the intake sides of the leveling valves. Thereafter, the exhaust side of each leveling valve will be mechanically moved to open position by the normal height sensing operation of the leveling valve and, therefore, offers no further obstruction to flow of high pressure air.

In order to protect the spring assemblies from the possibility of damage due to over-inflation, junction 34 incorporates a third relief valve 106 which is set at 165 p.s.i. Since relief valve 94 is disabled by operation of valve 84, whenever the device is operated in the manner just described, inflation of springs 2, 4, 6 and 8 is automatically limited to the degree of expansion produced by an equalized system pressure of 165 p.s.i., even though operation of the compressor is continued for a prolonged period.

In order to allow initial charging of the air suspension system without operation of the engine driven compressor, junction 34 includes a tire-type valve fitting 108 which is arranged in communicating relation with passage 72 by a diagonal branch passage 110. In order to utilize an external source of compressed air for charging the system, valve 80 is rotated to a position wherein closure 84 engages valve seat 86, thus blocking low pressure blow-off 94. Air is then introduced into the system by means of a conventional air hose in the manner employed in inflating vehicle tires. Since both the intake and exhaust lines are in direct communication with passage 110 due to the downward displacement of valve closure 98, the system may be quickly charged with equalized pressure corresponding to the source pressure if the latter is less than the blow-off setting of relief valve 106 or alternately with a maximum pressure of 165 p.s.i., if the source pressure is greater. Following charging of the system, manual manipulation of valve 80 to the position shown in Fig. 2 places the air distribution system in condition for normal operation.

While but one embodiment of the invention has been shown and described, it will be apparent that numerous changes and modifications may be made therein. Therefore, it is to be understood that the invention is not limited to the embodiment shown, but only by the scope of the claims which follow.

What is claimed is:

1. In the air suspension system having a high and low pressure circuit, fluid distribution apparatus comprising a junction member having a high pressure manifold including an inlet and a plurality of outlets communicating with said high pressure circuit and a low pressure manifold including an outlet and a plurality of inlets communicating with said low pressure circuit, a relief valve disposed between said high and low pressure manifolds adapted to discharge fluid from the former into the latter when the pressure in the former reaches a predetermined level, a second relief valve adapted to discharge fluid to atmosphere from said low pressure manifold when the pressure therein reaches a second predetermined level, a pair of synchronously operable manual valves, one of which moves from an open position to a closed position blocking flow of fluid through said low pressure outlet and said second relief valve while the other moves from a closed position to an open position allowing free flow of fluid from said high pressure circuit to said low pressure circuit.

2. In an air suspension system having a high and low pressure circuit, fluid distribution apparatus comprising a junction member having a high pressure manifold including an inlet and a plurality of outlets communicating with said high pressure circuit and a low pressure manifold including an outlet and a plurality of inlets communicating with said low pressure circuit, a relief valve disposed between said high and low pressure manifolds adapted to discharge fluid from the former into the latter when the pressure in the former reaches a predetermined level, a second relief valve adapted to discharge fluid to atmosphere from said low pressure manifold when the pressure therein reaches a second predetermined level, a pair of synchronously operable manual valves, one of which moves from an open position to a closed position blocking flow of fluid through said low pressure outlet and said second relief valve while the other moves from a closed position to an open position allowing free flow of fluid from said high pressure circuit to said low pressure circuit, and a third pressure sensitive valve adapted to discharge fluid to atmosphere from said high and low pressure manifold when the pressure therein reaches a predetermined level higher than that of the second valve but lower than that of the first valve with the one valve of said synchronously operable pair in closed position and the other in open position.

3. The structure set forth in claim 2 wherein one of said synchronously operable valves is normally spring biased to closed position.

4. The structure set forth in claim 3 wherein said spring biased valve non-rotatively engages the other of said valves.

5. The structure set forth in claim 2 including an inlet fitting associated with said low pressure manifold allowing induction of air from an external source of air pressure.

References Cited in the file of this patent

UNITED STATES PATENTS

| | | |
|---|---|---|
| 697,694 | Toal | Apr. 15, 1902 |
| 2,464,110 | Wright | Mar. 8, 1949 |